United States Patent [19]

Walblay

[11] Patent Number: 4,647,103
[45] Date of Patent: Mar. 3, 1987

[54] VEHICLE BED COVER

[76] Inventor: Edward J. Walblay, 5448 Kenicott Tr., Brighton, Mich. 48116

[21] Appl. No.: 824,603

[22] Filed: Jan. 31, 1986

[51] Int. Cl.[4] .............................................. B60P 7/04
[52] U.S. Cl. .................................. 296/100; 160/368 R
[58] Field of Search ............ 296/100, 98; 160/368 R, 160/368 S, 327, 329

[56] References Cited

U.S. PATENT DOCUMENTS

| 4,036,521 | 7/1977 | Clenet | 296/100 |
| 4,061,394 | 12/1977 | Vodin | 296/100 |
| 4,526,416 | 7/1985 | Rode | 296/100 |

Primary Examiner—Robert R. Song
Attorney, Agent, or Firm—Gifford, Groh, VanOphem, Sheridan, Sprinkle & Dolgorukov

[57] ABSTRACT

A detachable cover for a cargo bed of a vehicle having spaced apart side walls on opposed sides of the bed. An elongated bracket having an elongated and substantially planar leg is secured to each side wall and rear so that the planar leg is spaced above the top of the side wall and forms an outwardly facing slot along the top of each cargo bed side and rear wall. A generally rectangular sheet of a material includes flat strips attached along opposed sides of the sheet. These strips are constructed of a semiflexible material so that, upon insertion of the strips into the outwardly facing slots, the strips attach the sheet to the vehicle so that the sheet covers the vehicle bed.

5 Claims, 4 Drawing Figures

VEHICLE BED COVER

BACKGROUND OF THE INVENTION

I. Field of the Invention

The present invention relates to a cover for a vehicle bed having an open top.

II. Description of the Prior Art

There are many types of different vehicles, such as pickup trucks, which include a rear cargo bed which is open at its top. These cargo beds typically include spaced apart and generally parallel side walls which, together with the rear wall or tail gate, defines the cargo bed.

There are many situations in which it is highly desireable to cover the cargo bed and thus protect not only the vehicle but also cargo within the bed from the elements. These covers also enhance the overall appearance of the vehicle.

In one previously known bed cover, a row of spaced snaps to the vehicle along the outside of both the vehicle bed side walls. The cooperating part of each snap is then attached to a flexible sheet which covers the cargo bed. The snaps on the sheet engage the snaps on the vehicle body to thereby secure the cover in place and across the vehicle bed. Furthermore, these snaps are typically arranged so that, with the cover secured to the vehicle body and across the bed, the sheet is maintained in a taut condition.

One disadvantage of these previously known bed covers is that the snaps must be individually snapped and unsnapped in order to attach or detach the cover, respectfully, to the vehicle body. This is not only time consuming but also difficult since the sheet frequently must be stretched and pulled repeatedly before the snap parts on the sheet come into alignment with their cooperating snap parts on the vehicle body.

A still further disadvantage of these previously known bed covers is that, due to the tautness of the sheet, the sides of the cover exhibit a scalloped appearance due to the spacing between the snaps. This scalloped appearance is unsightly and undesireable.

SUMMARY OF THE PRESENT INVENTION

The present invention provides a cover assembly for a vehicle cargo bed which overcomes all of the above-mentioned disadvantages of the previously known devices.

In brief, the cover assembly of the present invention comprises a pair of brackets wherein each bracket includes an elongated and substantially planar leg. One bracket is secured to each vehicle side wall so that the planar leg of each bracket is spaced above the top of its respected side wall. With the brackets thus attached to the side walls, an elongated and outwardly facing slide is formed along the top of each vehicle side wall. The bottom of the slot is formed by either the top of the vehicle or another leg on the bracket.

A generally rectangular sheet constructed of a flexible or stretchable material includes two sides, a front and a rear, and is dimensioned to cover the vehicle bed. A generally flat strip constructed of a rigid material is attached to the sheet adjacent each of its sides. Furthermore, the strips are dimensioned to be received within the outwardly facing slots formed by the brackets and, in doing so, detachably secure the sheet to the vehicle so that it extends across and covers the vehicle bed.

Preferably, a similar bracket is attached across the rear wall of the vehicle bed and a third strip is secured to the flexible sheet along its rear edge. This third strip is insertable into the rearwardly facing slot between the rear bracket and rear wall of the vehicle bed.

The cover assembly of the present invention can not only be rapidly and easily secured to and removed from the vehicle to cover and uncover the vehicle bed, but also provides an attractive and streamline appearance when attached to the vehicle.

BRIEF DESCRIPTION OF THE DRAWING

A better understanding of the present invention will be had upon reference to the following detailed description when read in conjunction with the accompanying drawing wherein like reference characters refer to like parts throughout the several views, and in which.

DETAILED DESCRIPTION OF PREFERRED EMBODIMENTS OF THE PRESENT INVENTION

Figure 1:
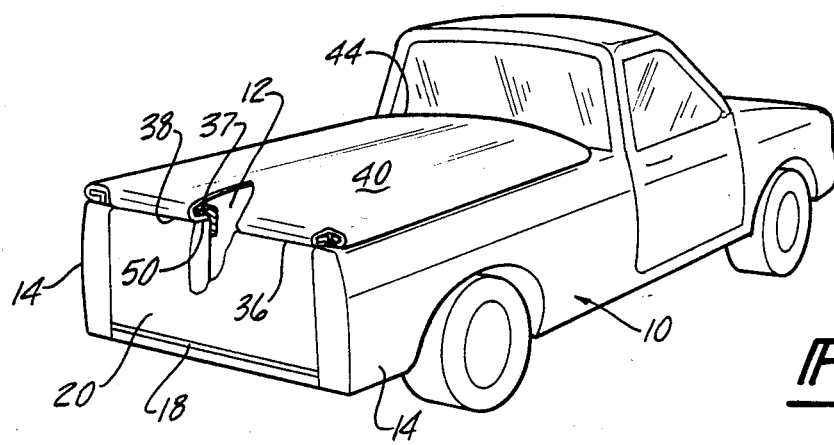
FIG. 1 is a perspective view illustrating a preferred embodiment of the present invention and with parts removed for clarity.

With reference first to FIG. 1, a vehicle 10, such as a pickup truck, is thereshown having an open bed 12 for carrying cargo. A pair of side walls 14 extend upwardly from a bottom 18 of the bed 12 and are generally parallel and spaced apart from each other. A rear wall or tailgate 20 also extends between the rear ends of the side walls 14 to close the rear of the vehicle bed 12.

Figure 2:
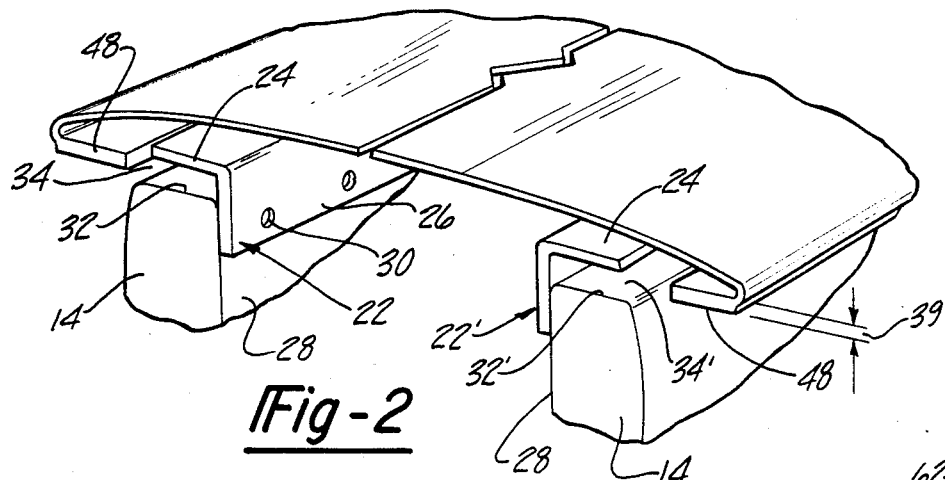
FIG. 2 is a fragmentary perspective view illustrating a portion of the preferred embodiment of the present invention.

With reference now to FIGS. 1 and 2, the present invention comprises a pair of elongated L-shaped brackets 22, wherein each bracket 22 has two elongated and generally planar legs 24 and 26 which intersect each other generally perpendicularly. Each bracket 22 preferably has a length substantially the same, or slightly less than, the length of the side wall 14.

Referring now particularly to FIG. 2, one bracket leg 26 is secured to an inside surface 28 of each vehicle side wall 14 by conventional fasteners 30 so that the second leg 24 is spaced upwardly from a top surface 32 of its associated vehicle side wall 14. In doing so, an elongated and outwardly facing slot 34 is formed between the top 32 of each vehicle side wall 14 and the bracket leg 24. These slots 34 each have a predetermined width or vertical heigth.

As best shown in FIG. 1, a third elongated L-shaped bracket 36 is similarly secured across the rear wall 20 of the vehicle body 10 thereby forming a rearwardly facing slot 38 between one leg 37 of the bracket 36 and the top of the vehicle rear wall 20. The thickness of the slot 38 is substantially the same as the slots 34.

Figure 3:
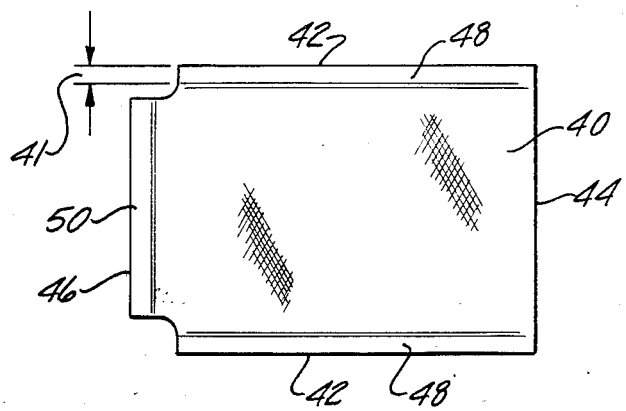
FIG. 3 is a top plan view illustrating one component of the present invention.

With reference now particularly to FIG. 3, a rectangular shaped sheet 40 of stretchable material includes two sides 42, a front 44 and a rear 46. An elongated flat strip 48 is secured to the sheet 40 along and closely adjacent each side 42 while a similar strip 50 is secured to the sheet 40 adjacent its rear edge 46. The strips 48 and 50 are constructed of a rigid material, such as wood, plastic, metal, and the like.

With reference again to FIG. 2, the thickness 39 of each strip 48 or 50 is less than the width of the slot 34 or 38. Conversely, the width 41 (FIG. 3) of each strip 48 is greater than the width of the slot 34 or 38. Consequently, the strips 48, together with their attached edges of the sheet 40, are insertable into the slots 34 so that, upon doing so, the strips 48 are sandwiched in between the bracket legs 24 and the corresponding top surface 32 of the side walls 14. The strip 50, together with the rear edge 46 of the sheet 40, is similarly inserted into the rearwardly facing slot 38. Furthermore, the sheet 40 is dimensioned so that, with the strips 48 and 50 positioned in the slots 34 and 38, respectively, the sheet 40 is maintained in a taut condition across and covering the vehicle bed.

In practice, the stretchability of the sheet 50 enables the strips 48 and 50 to be easily and rapidly inserted into or removed from their respective receiving slots 34 and 38. Once the strips 48 and 50 are in their respective receiving slots and the sheet 40 secured to the vehicle 10 so that it covers the vehicle bed 12, the vehicle with its covered bed enjoys a very streamline and neat appearance.

Figure 4:
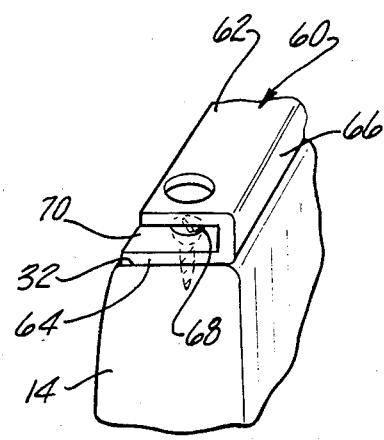
FIG. 4 is a fragmentary view illustrating a modification of the present invention.

With reference now to FIG. 4, a modification of the present invention is thereshown in which a U-shaped bracket 60 having two elongated side walls 62 and 64 and an elongated base wall 66 replaces the L-shaped bracket 30 of FIG. 2. One side wall 34 is attached by conventional fasteners 68 to the top 32 of each side wall 14 so that an outwardly facing slot 70 is formed between the side walls 62 and 64. This slot 70 is adapted to receive the strips 48 or 50 therein to secure the sheet 40 across the vehicle bed. Still other configurations for the bracket will be obvious to those having skill in the art.

The U-shaped bracket 60 can alternatively be mounted on the outside of the truck bed side walls. Such a construction could be used, for example, where a camper or cap is intended to be installed on the truck bed.

From the foregoing, it can be seen that the present invention provides a cover for a vehicle cargo bed which not only can be rapidly attached to and detached from the vehicle but which also provides a highly desireable streamline appearance.

Having described my invention, however, many modifications thereto will become apparent to those skilled in the art to which it pertains without deviation from the spirit of the invention as defined by the scope of the appended claims.

I claim:

1. In combination with a vehicle having an open cargo bed with spaced side walls, a cover assembly for the bed comprising:
 a pair of brackets, each bracket having an elongated and substantially planar leg,
 means for securing one bracket to one vehicle side wall and the other bracket to the other vehicle side wall so that each said planar leg is spaced upwardly from a top surface of its respective side wall thereby forming an outwardly facing slot having a predetermined width,
 a substantially rectangular sheet of stretchable material having a front, rear and two opposed sides, said sheet being dimensioned to cover said vehicle bed,
 a pair of elongated flat strips constructed of a rigid material,
 means for attaching one strip to and adjacent each side of said sheet so that said strips are spaced apart and parallel to each other, said strips having a thickness less than said predetermined width and a width greater than said predetermined width so that, with said strips inserted into said slots, said sheet of stretchable material applies a force which wedges said strips in said slots, thereby detachably securing said sheet across said bed.

2. The invention as defined in claim 1 wherein each bracket section extends substantially the entire length of its associated side wall.

3. The invention as defined in claim 1 wherein each bracket is elongated and substantially L-shaped thus having two elongated legs, one leg forming said planar leg, and wherein said securing means comprises means for fastening the other leg to an interior side of said side walls.

4. The invention as defined in claim 1 wherein each bracket is elongated and substantially C-shaped having two sides and a base, one of said sides forming said planar leg, and wherein said securing means comprises means for ataaching said other legs to said side wall top surfaces so that said bases face each other.

5. The invention as defined in claim 1 wherein said vehicle comprises a rear wall extending between said vehicle side walls, and comprising:
 a rear bracket having an elongated and substantially planar leg, means for securing said rear bracket to said rear wall so that said planar leg is spaced upwardly from a top surface of said rear wall by said predetermined amount thereby forming a rearwardly facing slot,
 a third elongated strip constructed of a rigid material, and
 means for attaching said third strip to and adjacent said rear of said sheet, said third strip adapted to be inserted into said rearwardly facing slot.

* * * * *